United States Patent [19]
Ellul et al.

[11] Patent Number: 5,656,693
[45] Date of Patent: Aug. 12, 1997

[54] THERMOPLASTIC ELASTOMERS HAVING IMPROVED CURE

[75] Inventors: Maria D. Ellul, Silver Lake Village; Donald R. Hazelton, Hudson, both of Ohio; Periagaram S. Ravishankar, Kingwood, Tex.

[73] Assignee: Exxon Chemical Patents Inc., Houston, Tex.

[21] Appl. No.: 490,505

[22] Filed: Jun. 14, 1995

[51] Int. Cl.$^6$ .................. C08L 9/00; C08L 23/00; C08L 67/02; C08L 77/00

[52] U.S. Cl. .................. 525/171; 525/184; 525/193; 525/194; 525/211

[58] Field of Search ...................... 525/211, 193, 525/194, 171, 184

[56] References Cited

U.S. PATENT DOCUMENTS

| | | |
|---|---|---|
| 3,637,617 | 1/1972 | Wirth . |
| 3,674,754 | 7/1972 | Cameli et al. ............ 260/79.5 B |
| 3,806,558 | 4/1974 | Fischer . |
| 4,031,169 | 6/1977 | Morris ........................ 260/897 |
| 4,130,535 | 12/1978 | Coran et al. . |
| 4,212,787 | 7/1980 | Matsuda et al. ............ 260/33.6 |
| 4,220,579 | 9/1980 | Rinehart .................... 260/33.6 |
| 4,311,628 | 1/1982 | Abdou-Sabet et al. ...... 260/33.6 |
| 4,895,903 | 1/1990 | Kobayashi et al. ........... 525/133 |
| 4,946,896 | 8/1990 | Mitsuno et al. ............. 525/93 |
| 4,985,502 | 1/1991 | Izumi et al. . |
| 5,157,081 | 10/1992 | Puydak et al. .............. 525/237 |
| 5,177,147 | 1/1993 | Spenadel et al. ............. 525/88 |
| 5,288,806 | 2/1994 | Peacock .................... 525/240 |
| 5,292,811 | 3/1994 | Murata et al. .............. 525/193 |
| 5,298,211 | 3/1994 | Hamanaka et al. ......... 264/211.24 |

FOREIGN PATENT DOCUMENTS

| | | |
|---|---|---|
| 94051 | 11/1983 | European Pat. Off. . |
| 0 246 745 A2 | 11/1986 | European Pat. Off. . |
| 0 225 063 A2 | 6/1987 | European Pat. Off. . |
| 0 275 925 A2 | 7/1988 | European Pat. Off. . |
| 366411 | 5/1990 | European Pat. Off. . |
| 4415654 | 7/1969 | Japan . |
| 53-144116 | 11/1978 | Japan . |
| S61-151758 | 1/1988 | Japan . |
| S62-210169 | 3/1989 | Japan . |
| 1018778 | 2/1966 | United Kingdom . |
| 1188129 | 4/1970 | United Kingdom . |
| 1294922 | 11/1972 | United Kingdom . |
| 1311946 | 3/1973 | United Kingdom . |
| 1 402 049 | 8/1975 | United Kingdom . |

*Primary Examiner*—D. R. Wilson
*Attorney, Agent, or Firm*—Douglas W. Miller

[57] ABSTRACT

Thermoplastic elastomers containing ethylene, alpha-olefin, vinyl norbornene elastomeric polymers provide superior cure levels to thermoplastic elastomers containing ethylene, alpha-olefin, diene monomer elastomeric polymers with other dienes than vinyl norbornene. The elastomeric polymers, along with a thermoplastic, curative, and other components will have cure levels in excess of 95 percent. Lower diene incorporation into the polymer combined with lower curative levels yield a fabricated article with improved resistance to compression set and improved heat aging.

22 Claims, No Drawings

THERMOPLASTIC ELASTOMERS HAVING IMPROVED CURE

TECHNICAL FIELD

Embodiments of the present invention relate generally to thermoplastic elastomers and articles made using the thermoplastic elastomers. More specifically, the present invention concerns certain thermoplastic elastomers having improved cure, thereby improving compression set resistance of articles made from thermoplastic elastomers. Various embodiments of the present invention generally relate to polymer blends which have a combination of both elastomeric and thermoplastic properties.

BACKGROUND

Thermoplastic elastomer (TPE) materials include those which generally have properties and performance similar to vulcanized rubber at service temperatures, yet can be processed and fabricated by methods commonly used to process thermoplastics. Thermoplastic elastomers can generally be reprocessed since they contain a thermoplastic component.

Thermoplastic elastomers based on blends of ethylene-propylene elastomeric polymers or ethylene, α-olefin, diene elastomeric polymers with semi-crystalline or crystalline polymers are known. Typically such compounds are made by dynamically curing the blend of rubber and resin. Shaped articles formed from the composition have generally elastomeric properties without the need for further cure.

In the past, such ethylene, alpha-olefin or ethylene, alpha-olefin, diene monomer elastomeric polymer/semi-crystalline or crystalline polyolefin type TPEs have found many uses. However, in some instances application has been limited by the fact that the dienes generally commercially available for making the ethylene, alpha-olefin, diene monomer elastomeric polymer portion of the thermoplastic elastomer do not yield a generally fully cured elastomer phase when peroxide is the curative. For purposes of this application, the term fully cured will mean any cure state above about 95 percent. The mechanism and means of determining cure state will be discussed further in this application. While a substantially full cure for previously available TPEs could be obtained by utilizing various non-peroxide curative mechanisms, peroxide cures of these or similar TPEs are generally not full cures because the amount of a peroxide compound necessary, combined with processing temperatures and shear (necessary for fabricating articles from the TPE), generally causes undesirable side effects in the crystalline or semi-crystalline polyolefin component of the TIE. These side effects may include, for example, cross linking of polyethylenes. In polypropylenes, a more common blend partner in TPEs, such side effects include chain scission of the polypropylene, resulting in an undesirable lowering of molecular weight. Therefore, a manufacturer or processor of thermoplastic elastomers walks a narrow line, on one side of the line lies the desirable more fully cured elastomer, but a degraded or property diminished crystalline or semi-crystalline polyolefin portion; and on the other side of the line lies a rubber portion with lower cure and a crystalline polyolefin portion that maintains substantially all of its original properties.

Many known thermoplastic elastomers utilize ethylene, alpha-olefin, diene monomer elastomeric polymers with varying amounts of a diene monomer generally selected from the group consisting of 5-ethylidene-2-norbornene, 1,4-hexadiene, 1,6 octadiene, 5-methyl-1,4 hexadiene, and 3,7-dimethyl-1,6-octadiene. Generally ethylene, alpha-olefin, diene monomer elastomeric polymers incorporating these types of dienes, when used in TPE compositions with peroxide curatives, suffer from the above discussed trade-off of increasing cure versus maintenance of the crystalline or semi-crystalline polyolefin properties.

Substantially fully cured TPEs are available utilizing other curative systems, for instance, phenolic type cures; an example would be Santoprene® (Monsanto Company) rubber. The general advantage of any fully cured or substantially fully cured TPE material is that its mechanical properties will generally be more desirable than a TPE with a lower degree of cure of the elastomer portion. However, the most important mechanical property for certain applications, resistance to compression set, will improve, generally with greater cure state. In TPEs having an ethylene, alpha-olefin, diene monomer elastomeric polymer cured less than about 90 percent, compression set is generally unacceptably high for many applications, especially at elevated temperatures.

It would be desirable, therefore, to have a commercial TPE available which allows an increased cure state, while having a minimum diminution of the crystalline or semi-crystalline polyolefin properties, as well as improved compression set resistance when compared to either partially cured peroxide, or substantially fully cured phenolic materials.

SUMMARY

We have discovered that a TPE made with an ethylene, alpha-olefin, diene monomer elastomeric polymer containing vinyl norbornene as the diene monomer, generally exhibits improved cure state over TPEs formulated with ethylene, alpha-olefin, diene monomer elastomeric polymers containing one or more dienes selected from the group consisting of 5-ethylidene, 1-2-norbornene, 1,4-hexadiene, 1,6 octadiene, 5-methyl-1,4 hexadiene, and 3,7-dimethyl-1,6-octadiene.

The TPEs of various embodiments of the present invention have improved physical properties over previously available peroxide-curable TPEs. Various embodiments of the present invention will include thermoplastic elastomer comprising: a) ethylene, alpha-olefin, vinyl norbornene elastomeric polymer; b) a crystalline or semi-crystalline thermoplastic; and c) a curative. The curative will be present in the TPE at a level effective to achieve at least about a 95 percent cure of the ethylene, alpha-olefin, vinyl norbornene elastomeric polymer.

The ethylene content of the ethylene, alpha-olefin-vinyl norbornene elastomeric polymer is generally in the range of from about 40 to about 90 mole percent, while the vinyl norbornene content is generally in the range of from about 0.2 to about 5 mole percent. The remainder of the polymer will generally include an α-olefin. The preferred alpha-olefin is propylene. The Mooney viscosity (ML) of the ethylene, alpha-olefin-vinyl norbornene elastomeric polymer at 125° C. will generally be greater than about 10. The thermoplastic component will be selected from the group consisting of polypropylene, polyethylene, polybutylene, or their copolymers, polyethylene teraphthalate (PET), polybutylene teraphthalate (PBT), polyamide (PA), and combinations thereof. The curative will generally be peroxides.

It will be understood by those of ordinary skill in the art that other additives, such as process oils, plasticizers, fillers, antioxidants, and other components necessary for the processing or end use properties, can be included without departing from the scope of the present invention

Description

Introduction

Various embodiments of this invention concern certain classes of thermoplastic elastomers (TPEs), produced by dynamic vulcanization, and articles fabricated from these TPEs. These TPEs have unique properties which make them particularly well suited for use in producing certain classes of fabricated polymeric articles. Such articles include, but are not limited to, medical tubing, gaskets, seals, o-rings, air bag door coverings, lip seals, automotive components e.g. boots, bellows, weather strips, and the like. Such articles generally have combinations of properties rendering them superior to similar articles previously available from peroxide, substantially partially cured TPEs. Additionally, the TPEs of certain embodiments of the present invention show a surprising increase in their ability to be cured via relatively low levels of curative and exhibit substantially improved resistance to compression set compared to previously available peroxide cured TPEs. TPEs of certain embodiments of the present invention have a cure state and resultant resistance to compression set, that compares favorably with previously available resin cured TPEs. Furthermore, TPEs of certain embodiments of the present invention have a cure state and resultant resistance to compression set, that is better than that of previously available resin-cured TPEs. Moreover, the use of peroxide cure permits the user of the TPE to develop properties generally unattainable with a resin cure, for example, a white color and non-hygroscopic properties.

Following is a detailed description of certain preferred embodiments within the scope of this invention, preferred methods of producing these TPEs and preferred applications of these TPEs. Those skilled in the art will appreciate that numerous modifications to these preferred embodiments can be made without departing from the scope of the invention. For example, while the properties of TPEs are exemplified in lens gasketing, o-rings, lip seals, shaft seals, bellows, boots, air bag door covers, extruded profiles, and the like, the TPEs have numerous other uses. To the extent that the description is specific, this is solely for the purpose of illustrating certain preferred embodiments of this invention and should not be taken as limiting this invention to these specific embodiments.

The used of subheadings in the Description is intended to assist the reader and is not intended to limit the scope of our invention.

It has been discovered that the inclusion of vinyl norbornene as the non-conjugated diene component of an ethylene, alpha-olefin, diene monomer elastomeric polymer portion era TPE, produces TPEs having higher cure state, generally at a lower peroxide curative level, while substantially maintaining properties generally attributable to the crystalline or semi-crystalline polyolefin portion of the TPE. Generally these TPEs will require lower levels of diene necessary to achieve similar physical properties to previously available TPEs. In these regards, the TPEs of the present invention differ markedly from conventional peroxide cured TPEs containing ethylene, alpha-olefin, diene monomer elastomeric polymers utilizing as a comonomer, for example 5-ethylidene-2-norbornene, 1,4-hexadiene, 1,6-octadiene, 5-methyl-1, 4-hexadiene, and combinations thereof. The ability to produce TPEs with a cure state generally in excess of about 95 percent while maintaining physical properties attributable to the crystalline or semi-crystalline polymer, has generally been previously unattainable with peroxide cure systems. The TPE compositions of certain preferred embodiments of the present invention will generally have at least two polymeric components or groups of components, a crystalline or semi-crystalline polymer, and an ethylene, alpha-olefin, diene monomer elastomeric polymer. The combinations of these materials along with other additives, curatives, extenders, and the like, well known to those of ordinary skill in the art can be achieved by several schemes including roll milling, internal mixing, twin screw extruding, and the like, preferably in a nitrogen or other inert atmospheres to maximize the efficiency of the cross linking reactions by peroxides.

The Crystalline or Semi-Crystalline Polymer Component

The crystalline or semi-crystalline polymer resin used to make the TPE is a solid, generally high molecular weight plastic material made by polymerizing or copolymerizing such olefins as ethylene, propylene, butene-1, pentene-1, 4-methyl-pentene-1, hexene-1, octene-1, and combinations thereof, in any conventional manner, including so called Phillips catalyzed reactions, conventional Ziegler-Natta type polymerizations, and catalysis such as metallocene catalyzed including, but not limited to metallocene-alumoxane and metallocene-ionic activator catalysts materials. Also, the general crystalline or substantially crystalline material can be chosen from polyethylene terephthalate, polybutylene terephthalate, polyamide and combinations thereof. If polyethylene is the polyolefin material of choice, it will generally have a density in the range of from about 0.86 to about 0.97 g/cc. Preferred ranges: 0.86 to 0.97, 0.88 to 0.95, with the most preferred being in the range of from about 0.90 to about 0.92 g/cc. Polypropylene is a preferred polyolefin plastic and will generally have a highly crystalline isotactic or syndiotactic form. Often the density of polypropylene is in the range of from about 0.85 to about 0.91 g/cc. Largely isotactic polypropylene has a density generally in the range of from about 0.90 to about 0.91 g/cc. Generally crystalline copolymers of propylene with ethylene, butene-1, hexene-1, 4-methyl-1-pentene, octene-1 combinations thereof and the like are also contemplated. High and ultra high molecular weight polypropylene of fractional melt flow rate is preferred, generally indicated by a melt flow rate less than or equal to 1.0 dg/min. Melt flow rate (MFR) of the polypropylenes will be in the range of 0.1 to 30, preferably 0.1 to 10, more preferably 0.3 to 0.9, dg/min., most preferably a melt flow rate less than or equal to 0.8 dg/min. (ASTM-D1238).

The semi-crystalline or crystalline polymer will be generally present in the TPE composition in the range of from about 10 to 900 parts per hundred rubber (phr); preferably in the range of from about 20 phr to about 200 phr; more preferably in the range of from about 20 phr to about 100 phr The polyolefins suitable for use in the compositions of the invention include thermoplastic crystalline polyolefin, or semi-crystalline homopolymers and copolymers. As used in the specification and claims the term polypropylene includes homopolymers of propylene as well as reactor copolymers of polypropylene which can contain about 1 to about 40 wt percent ethylene and/or an α-olefin comonomer of 4 to 16 carbon atoms and mixtures thereof.

The Ethylene, Alpha-Olefin, Vinyl Norbornene Elastic Polymer Component

The ethylene, alpha-olefin, diene monomer elastomeric polymer component contains ethylene in the range of from about 40 to about 90 mole percent, preferably in the range of from about 50 to about 90 mole percent, more preferably in the range of from about 50 to about 85 mole percent, based on the total moles of the elastomeric polymer. The elastomeric polymer contains vinyl norbornene in the range of about 0.2 to about 5 mole percent, preferably in the range of from about 0.2 to about 4 mole percent, more preferably in the range of from about 0.2 to about 3 mole percent, most preferably in the range of from about 0.4 to about 1.5 mole percent, based on the total moles of the elastomeric polymer. The balance of the elastomeric polymer will generally be made up of an alpha-olefin, selected from the groups consisting of propylene, butene-1, 4-methyl-1-pentene, hexene-1, octene-1, decene-1 and combination thereof. Preferred are propylene, hexene-1 and octene-1. The alpha-olefin or alpha-olefins will be present in the elastomeric polymer in the range of from about 10 to about 60 mole percent, preferably 10 to 50 mole percent, more preferably 15 to 50 mole percent.

The elastomeric polymer will have a Mooney viscosity generally at least about 10 {ML(1+4), 125° C.}, preferably at least about 15, more preferably at least about 20 and MST [(5+4), 200° C.], below about 90, preferably below about 70, more preferably below about 60. MST values above 90 are also contemplated as long as the polymer is substantially gel free.

For peroxide cure applications, vinyl norbornene containing ethylene, alpha-olefin, diene monomer elastomeric polymers of comparable diene content generally require lower levels of peroxide to attain the same cure state compared to ethylene, alpha-olefin diene monomer elastomeric polymers with, for example, 5-ethylidene-2-norbornene, as the termonomer. Typically 20 to 50 percent lower peroxide concentrations can be realized to reach the same cure state using ethylene, alpha-olefin-vinyl norbornene elastomeric polymer. The efficiency of vinyl norbornene in providing high cross link density with peroxide vulcanization also generally permits a reduction in the overall diene level necessary to generally attain the same cure state as ethylidene norbornene based elastomeric polymers. This results in enhanced heat aging performance, generally owing to lower diene incorporation. This unique combination of improved properties including improved compression set, improved processability, lower peroxide usage and enhanced heat aging, are generally the benefits provided by ethylene, alpha-olefin, vinyl norbornene elastomeric polymers compared to commercially available ethylene, alpha-olefin, diene monomer elastomeric polymers which include conventional non-conjugated dienes such as 5-ethylidene-2-norbornene (ENB), 1,4-hexadiene, 1,6 octadiene, 5-methyl-1,4 hexadiene, 3,7-dimethyl-1,6-octadiene, or the like (when included in ethylene, alpha-olefin, diene monomer elastomeric polymers) including terpolymers or tetra polymers.

For the fabrication of translucent TPEs, where lack of haze is of importance, the preferred ranges of the elastomeric polymer are in the range of from about 70 to about 90 mole percent ethylene, and in the range of from about 0.2 to about 1.5 mole percent vinyl norbornene, preferably 0.4 to 1.5 and a range of Mooney viscosities from about 20 (ML) to 60 (MST). These ranges generally provide a refractive index matching the syndiotactic polypropylene phase.

Method of Producing Ethylene, Alpha-Olefin, Diene Monomer Elastomeric Polymer Component Ziegler polymerization of the exocyclic double bond of vinyl norbornene incorporated in the elastomeric polymer backbone is generally believed to produce a highly branched ethylene, alpha-olefin, diene monomer elastomeric polymer. This method of branching permits the production of such ethylene, alpha-olefin, diene monomer elastomeric polymer substantially free of gel, which would normally be associated with cationically branched ethylene, alpha-olefin, diene monomer elastomeric polymers containing, for instance 5-ethylidene-2-norbornene, as the (diene) termonomer. The synthesis of substantially gel-free ethylene, alpha-olefin, diene monomer elastomeric polymer elastomers containing vinyl norbornene is discussed in Japanese laid open patent applications JP 151758, and JP 210169, which are incorporated herein by reference for purposes of U.S. patent practice. Preferred embodiments of the synthesis disclosed in these documents is described below. The resulting elastomeric polymer is expected to have a $M_w/M_n$ greater than about 6, and a branching index less than about 0.5. Other polymerization catalysts such as the metallocene type metallocene-alumoxane or metallocene-ionic activator catalysts can be used for applications, where a high level of branching may not be desirable.

Preferred embodiments of the aforementioned documents to synthesize polymers suitable for certain embodiments of our invention are described below:

The catalysts used are $VOCl_3$ (vanadium oxytrichloride) or $VCl_4$ (vanadium tetrachloride). The co-catalyst is chosen from (i) ethyl aluminum sesqui chloride (SESQUI), (ii) diethyl aluminum chloride (DEAC) and (iii) equivalent mixture of diethyl aluminum chloride and triethyl aluminum (TEAL).

The polymerization is preferably carried out in the presence era solvent in a continuous stirred tank reactor at 20°–65° C. at a residence time of 6–15 minutes at a pressure of 7 kg/cm². The concentration of vanadium to alkyl is from 1:4 to about 1:10. About 0.2 to 1.5 kg of polymer is produced per gm of catalyst fed to the reactor. The polymer concentration in the hexane solvent is in the range of 3–8 percent by weight. Other catalysts and co-catalysts contemplated are discussed in the two Japanese laid open patent applications incorporated by reference above.

The resulting polymers has the following molecular characteristics:

The intrinsic viscosities measured in decalin at 135° C. were in the range of 1–3 dl/g. The molecular weight distribution ($M_w/M_n$) is greater than or equal to 6. The branching index was in the range 0.1–0.3.

The relative degree of branching in ethylene, alpha-olefin, diene monomer elastomeric polymers is determined using a branching index factor (BI). Calculating this factor requires a series of three laboratory measurements of polymer properties in solutions as disclosed in VerStrate, Gary, "Ethylene-Propylene Elastomers", Encyclopedia of Polymer science and Engineering, 6, 2nd edition (1986). These are:

(i) $M_{w,GPC\ LALLS}$, weight average molecular weight measured using a low angle laser light scattering (LALLS) technique in combination with Gel Permeation Chromatography (GPC)

(ii) weight average molecular weight ($M_{w,DRI}$) and viscosity average molecular weight ($M_{v,DRI}$) using a differential refractive index (DRI) detector in combination with GPC and (iii) intrinsic viscosity (IV) measured in decalin at 135° C. The first two measurements are obtained in a GPC using a filtered dilute solution of the polymer in trichlorobenzene.

An average branching index is defined as:

$$BI = \frac{M_{v,br} \times M_{w,DRI}}{M_{w,GPC,LALLS} \times M_{v,GPC,DRI}} \quad (1)$$

where, $M_{v,br}=k(IV)^{1/a}$;

and 'a' is the Mark-Houwink constant (=0.759 for ethylene, propylene diene elastomeric polymers in decalin at 135° C).

From equation (1) it follows that the branching index for a linear polymer is 1.0, and for branched polymers the extent of branching is defined relative to the linear polymer. Since at a constant $M_n$, $(M_w)_{branch} > (M_w)_{linear}$, BI for branched polymers is less than 1.0, and a smaller BI value denotes a higher level of branching. BI values of the ethylene, alpha-olefin, diene monomer elastomeric polymers of certain embodiments of our invention will be below about 1, preferably below about 0.6, more preferably below about 0.4, most preferably below about 0.3. It should be noted that this method indicates only the relative degree of branching and not a quantified amount of branching as would be determined using direct measurement, i.e. NMR.

The synthesis of ethylene, alpha-olefin-vinyl norbornene polymers were conducted both in a laboratory pilot unit (output about 4 Kg/day) and a large scale semi works unit (output one ton/day).

Metallocene catalysis of the above monomers is also contemplated including a compound capable of activating the Group 4 transition metal compound of the invention to an active catalyst state is used in the invention process to prepare the activated catalyst. Suitable activators include the ionizing noncoordinating anion precursor and alumoxane activating compounds, both well known and described in the field of metallocene catalysis.

Additionally, an active, ionic catalyst composition comprising a cation of the Group 4 transition metal compound of the invention and a noncoordinating anion result upon reaction of the Group 4 transition metal compound with the ionizing noncoordinating anion precursor. The activation reaction is suitable whether the anion precursor ionizes the metallocene, typically by abstraction of $R_1$ or R2, by any methods inclusive of protonation, ammonium or carbonium salt ionization, metal cation ionization or Lewis acid ionization. The critical feature of this activation is cationization of the Group 4 transition metal compound and its ionic stabilization by a resulting compatible, noncoordinating, or weakly coordinating (included in the term noncoordinating), anion capable of displacement by the copolymerizable monomers of the invention. See, for example, EP-A-0 277,003, EP-A-0 277,004, U.S. Pat. No. 5,198,401, U.S. Pat. No. 5,241,025, U.S. Pat. No. 5,387,568, WO 91/09882, WO 92/00333, WO 93/11172 and WO 94/03506 which address the use of noncoordinating anion precursors with Group 4 transition metal catalyst compounds, their use in polymerization processes and means of supporting them to prepare heterogeneous catalysts. Activation by alumoxane compounds, typically, alkyl alumoxanes, is less well defined as to its mechanism but is none-the-less well known for use with Group 4 transition metal compound catalysts, see for example U.S. Pat. No. 5,096,867. Each of these documents are incorporated by reference for purposes of U.S. patent practice.

Other TPE Ingredients

The TPE can contain reinforcing and nonreinforcing fillers, zinc oxide, antioxidants, stabilizers, rubber processing oils, plasticizers, lubricants (for example, oleamide), anti-blocking agents, anti-static agents, waxes, coupling agents for the fillers, foaming agents, pigments, flame retardants, and other processing aids, fillers and the like, known to those of ordinary skill in the art. The pigments, fillers and other adjuvants can comprise up to 50 weight percent of the total TPE composition based on the polymer components plus additives. Preferably the pigments, fillers and other components comprise about 0 to 30 weight percent based on the total composition.

Fillers can be inorganic fillers, such as calcium carbonate, clays, silica, talc, titanium dioxide, or organic carbon black, combinations thereof, and the like. Any type of carbon black can be used, such as channel blacks, furnace blacks, thermal blacks, acetylene blacks, lamp blacks, combinations thereof and the like. Rubber process oils have particular ASTM designations depending on whether they fall in class of paraffinic, naphthenic, or aromatic process oils. They are derived from petroleum fractions. The type of process oils utilized will be as customarily used in conjunction with the rubber component. The ordinary skilled person will recognize which type of oil should be utilized for that particular rubber. The quantity of rubber process oil utilized is based on the total rubber content, both cured and uncured and can be defined as the ratio by weight of the process oil to the total rubber in the TPE. This ratio can vary from about 0 to about 2.5/1, preferably from about 0.2:1 to about 1.0:1, more preferably from about 0.3:1 to about 1.3:1. Larger amounts of process oil can be used, the effect being generally reduced physical strength of the composition. Oils other than petroleum-based oils, such as oils derived from coal tar and pine tar, can also be utilized. In addition to petroleum-derived rubber process oils, organic esters and other synthetic plasticizers can be used. Plasticizers suitable for these compositions are covered in U.S. Pat. No. 5,290,886, and U.S. Pat. No. 5,397,832 incorporated herein by reference for purposes of U.S. patent practice.

Antioxidants that can be used in the formulations of certain embodiments of the present invention are disclosed in U.S. Pat. No. 5,157,081 incorporated herein by reference for purposes of U.S. patent practice. Organic peroxides for curing of various embodiments of the present invention are also disclosed in this document, as are accelerators and a method of combining the elastomeric polymer or elastomers, crystalline or substantially crystalline, polyolefin.

Degree of Cure

The term "substantially fully cured" or "substantially fully vulcanized" as used in the specification and claims with respect to the elastomeric polymer of the TPE, means that the rubber or elastomeric component of the TPE to be vulcanized, has been cured to a state in which its properties are substantially similar to those of the rubber alone in its conventional highly-cured vulcanized state. The degree of cure of the vulcanized rubber can be described in terms of gel content, or conversely, extractable components. Alternatively the degree of cure can be expressed in terms of cross link density. Where the determination of extractables is used as the measure of the state of cure, the improved thermoplastic elastomer compositions described herein are produced by curing the curable rubber components of the Thermoplastic elastomer blends to the point where the composition contains no more than about 5 percent by weight of the curable rubber component extractable at room temperature by a solvent which dissolves the rubber which is intended to be vulcanized but has not been. The rubbers are preferably vulcanized to the point that the composition contains less than about 4 percent by weight of these extractables, more preferably less than about 3 percent. In general, the less extractables in the cured rubber component the better the desired physical properties of the cured TPE. Still more preferable are compositions comprising essentially no extractable rubber from the cured rubber phase.

Alternatively, the degree of cure as determined by the above discussed extractables of the elastomer portion of the TPEs of certain embodiments of the present invention is preferably above about 95 percent, more preferably above about 96 percent, and most preferably above about 97 percent. Cure percentage may be described as 100 percent of the elastomeric polymer content minus the amount extracted as described above.

Another method of determining degree of cure is gel content reported as percent gel determined by a procedure which comprises determining the amount of insoluble polymer by soaking the specimen for 48 hours in organic solvent at room temperature and then weighing the dried residue and making suitable corrections based on knowledge of the composition. Thus, corrected initial and final weights are obtained by subtracting from the initial weight the weight of the soluble components other than the rubber to be vulcanized, such as extender oils, plasticizers, and components of the composition soluble in organic solvent as well as the rubber component of the TPE which is not intended to be cured. Any insoluble pigments, fillers, and the like are subtracted from both the initial and final weights.

Still another measure of degree of cure is the cross link density of the rubber.

Curative

Curatives will be generally selected from organic peroxides. Peroxide concentration (in a dynamically vulcanizable TPE) will generally be in the range of from about $1\times10^{-4}$ mole to about $2\times10^{-2}$ mole per hundred parts of rubber, preferably between about $2\times10^{-4}$ to about $2\times10^{-3}$ mole and more preferably about $7\times10^{-4}$ mole to about $1.5\times10^{-3}$ mole per hundred parts of rubber. Examples of organic peroxide are di-tert-butyl peroxide, dicumyl peroxide, t-butylcumyl peroxide, α,αbis(tert-butylperoxy)diisopropyl benzene, 2,5 dimethyl 2,5-di(t-butylperoxy)hexane, 1,1-di(t-butylperoxy)-3, 3,5-trimethyl cyclohexane, n-butyl-4, 4-bis(tert-butylperoxy) valerate, benzoyl peroxide, lauroyl peroxide, dilauroyl peroxide, 2,5-dimethyl-2, 5-di(tert-butylperoxy) hexene-3, and in general diaryl peroxides, ketone peroxides, peroxydicarbonates, peroxyesters, dialkyl peroxides, hydroperoxides, peroxyketals and combinations thereof.

Azo initiators such as Luazo® AP (available from ATO Chemical) may also be used as free radical initiators. In addition to the peroxide, other cure adjuvants or coagents can be used. Examples are triallyl cyanurate, triallyl isoeyanurate, triallyl phosphate, sulfur, N-phenyl bismaleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, polyfunctional metacrylates, acrylate and methacrylate metal salts, oximer for e.g. quinone dioxime. In order to maximize the efficiency of peroxide/coagent crosslinking the mixing and dynamic vulcanization are carded out in a nitrogen atmosphere.

In order to minimize the scission reaction of polypropylene in the presence of peroxides, the coagents described above namely sulfur, triallylcyanurate and triallylphosphate may be mixed with the polypropylene in a separate step to form a master batch. This master batch is then used to make the dynamically vulcanized TPE using peroxide curatives and additional coagents if necessary. This mixing practice is discussed in U.S. Pat. No. 4,087,485, incorporated herein by reference for purposes of U.S. patent practice.

Fabricated Articles

Fabricated articles made from the thermoplastic elastomers of certain embodiments of the present invention include, without limitation, lens gaskets, food contact materials/containers, medical devices, tubing, seals, automotive components, bellows, boots, airbag door covers, instrument panel skins and extruded profiles.

Test Methods

TPE and molded article properties cited in the specification are determined in accordance with the following test methods:

| Property | Units | Procedure |
|---|---|---|
| Hardness | Shore A | ASTM D 2240 |
| Stress at 100% elongation | MPa | ASTM D 412 |
| Tensile Strength | MPa | ASTM D 412 |
| Elongation at Break | % | ASTM D 412 |
| Tension Set | % | ASTM D 412 |
| Compression Set (22 hrs. at 100° C.) | % | ASTM D 395B |
| Weight Change | %* | ASTM D 471 |
| Compression Stress Relaxation | $s^{-1}$ | outlined below① |
| Chemical Resistance (Mass Uptake) | % | ASTM D 471–79 |

*Fluid ASTM #3 (24 hours at 125° C.)
①a compression molded button or die cut molded placques are used to obtain the dimensions of test sample:
Diameter: 0.710 +/– 0.010 in.
Thickness: 0.500 +/– 0.015 in.
Deformation applied: 25% of original thickness
Rate of Deformation: 10 in./min
Test Duration: 30 min.
Relaxation rate:
1. Obtain stress versus time data
2. Plot log stress versus log time
3. Do linear regression fit and obtain slope The obtained slope is a measure of the stress relaxation behavior of the material. A small slope is an indication of better sealing capability.

EXAMPLES 1–5

A number of formulations are compounded using peroxide and coagent cure systems. The control is Santoprene® 201-64 (Monsanto Company), phenolic resin cured (Example 5). The Santoprene material is chosen as a control because it exhibits very good "full" cure and resulting relatively low compression set. Example 1 utilizes Vistalon® 4608 available from Exxon Chemical Company, which has a nominal ethylene content of 48 weight percent and a nominal ethylidene norbornene content of 3.3 weight percent. The other formulation and ingredients are shown in Table I. In Example 2, the same formulation is used substituting only Vistalon® 8600 also available from Exxon Chemical Company. Vistalon® 8600 has a nominal ethylene content of 51 weight percent and a nominal ethylidene norbornene content of 9 weight percent. Examples 3 and 4 are compounded utilizing two different vinyl norbornene containing ethylene, alpha-olefin, diene monomer elastomeric polymers. Example 3 containing a nominal 50 weight percent of ethylene and a nominal 3 weight percent vinyl norbornene, the remainder being propylene. Example 4, ethylene at a nominal 54 weight percent and vinyl norbornene at 1.6 weight percent, with the remainder being propylene. As can be seen from Table I, the hardness of generally all of Examples 1–5 is in the range of 60–68 Shore A. The control or comparison, Santoprene®, has a compression set of 32 percent. Example 2 with 9 percent ethylidene norbornene, shows a similar compression set at 30 percent. However, Example 1 at approximately 3.3 weight percent ethylidene norbornene, shows a compression set approximately 25 percent higher (40 percent compression set) than the control. On the other hand, Example 3 containing vinyl norbornene at a nominal, 3 weight percent, shows an approximate 30 percent decrease or improvement in compression set when compared to the control. Example 4, containing a nominal 1.6 weight percent vinyl norbornene, shows approximately 15 percent reduction in compression set compared to the control. The type of cure system also has a substantial effect on moisture uptake. It is significant that peroxide cure system provides a significant improvement in moisture uptake over the resin cure due to the absence of catalysts and resin.

EXAMPLES 6–11

In this series of examples, an ethylene, alpha-olefin, diene monomer elastomeric polymer was cured at a given level of peroxide curative and the extent of cure was tested as a percent cured rubber insoluble in cyclohexane at 23° C. Example 6 utilizes the Vistalon® 8600 of Example 2 above. Example 7 utilizes the vinyl norbornene elastomeric terpolymer of Example 4 above. Example 8 utilizes the vinyl norbornene elastomeric polymer of Example 3 above. While Example 9 utilizes a nominal 50 weight percent ethylene and 4.9 weight percent vinyl norbornene elastomer. Example 10 utilizes the polymer of Example 9, but with a peroxide loading of twice of that of Example 9. Example 11 is the control, Santoprene 201-64.

Table. II shows that the control or Example 11 has a percent cured rubber of approximately 95 percent. While the comparative example, Example 6, shows a 92 percent cured rubber fraction. Examples including embodiments of the present invention, Examples 7, 8, 9 and 10 show cured rubber percentages in the range of 94 percent to 98 percent. The degree of cure also has a significant effect on stress relaxation, where the commercial peroxide cure of TPE Milastomer® 6030 available from Mitsui Chemical Co. is not "fully" cured.

EXAMPLES 12–15

Polymers containing three different vinyl norbornene levels (Examples 12, 13 and 14 with 4.9, 3.0, and 1.6 weight percent vinyl norbornene respectively) are compounded and tested to determine the effect of vinyl norbornene level on peroxide cured TPEs. The results shown in Table III, indicate that with decreasing vinyl norbornene content, hardness (Shore A) is slightly reduced, elongation at break appears to go through a maximum at 3 percent vinyl norbornene inclusion, (Example 13) while compression set increases at the lowest percentage (nominal 1.6 weight percent vinyl norbornene) (Example 14). However, chemical resistance at all vinyl norbornene levels is superior to fully cured TPEs, based on resin cure (Example 15 Santoprene® 201-64).

EXAMPLES 16 and 17

Table IV shows typical properties of an ultra low compression set TPE based on the ethylene, alpha-olefin, vinyl norbornene elastomeric polymer The hardness of the Example 16 polymer (an ethylene (50 wt %), propylene (47.2 wt %), vinyl norbornene (2.8 wt %) elastomeric polymers) compared to the Santoprene®, Example 17 (control), is not substantially different. Whereas the compression set of the material of an embodiment of the present invention is approximately 50 percent of that of the control, Santoprene®, a substantial improvement.

EXAMPLES 18–20

Translucent peroxide cured TPEs were formulated per copending U.S. Ser. No. 08/206,984, now abandoned. In addition, other compositions were made using the polymer of this invention ethylene, alpha-olefin, vinyl norbornene, to get improved compression set. Care was taken in the selection of ethylene, alpha-olefin, vinyl norbornene elastomeric polymer and polypropylene to closely match their refractive indices. Example 18 is a comparative example and the elastomeric polymer contains approximately 3 weight percent ethylidene norbornene. Example 19 had a vinyl norbornene content of approximately 0.8 weight percent. While, Example 20 had approximately 4 times as much vinyl norbornene than Example 19 at 3.2 weight percent. These products have a Mooney viscosity, ML(1+4) @ 125° C., respectively, of 31 and 42. The haze of Example 18 at 52 is generally bracketed by Examples 19 and 20 (57 and 47, respectively). While the compression set of both Examples 19 and 20 are approximately 12 and 25 percent less, respectively, than that of comparative Example 18. The slight differences in haze may be due to the differences in ethylene content between the polymers.

EXAMPLES 21–31

Polymer of Example 10 is used in the preparation of carbon black or clay filled TPEs at different oil levels. It is shown in Table VI that highly filled TPEs that retain good physical properties can be prepared using ethylene, alpha-olefin, vinyl norbornene elastomeric polymers.

Conclusion

Although the present invention has been described in considerable detail with reference to certain preferred versions thereof, other versions are possible. For example, other levels of vinyl norbornene and other TPE formulations and combinations are also contemplated. Therefore the spirit and scope of the appended claims should not be limited to the description of the preferred versions contained herein.

TABLE I

| Formulation | Ex. 1 | Ex. 2 | Ex. 3 | Ex. 4 | Ex. 5* Santoprene ® |
|---|---|---|---|---|---|
| Vistalon ® 4608, C2+ = 48% ENB+ = 3.3% | 100 | — | — | — | |
| Vistalon ® 8600, C2 = 51% ENB = 9.0% | — | 100 | — | — | Control Resin Cured |
| V6333B, C2 = 50%; VNB° = 3.0% | — | — | 100 | — | |
| V6374A, C2 = 54%; VNB = 1.6% | — | — | — | 100 | |
| PP, Isotactic Polypropylene, MFR = 0.7 | 32 | 32 | 32 | 32 | |
| White Hydrotreated Oil, HT Brightstock, PetroCanada | 49 | 49 | 49 | 49 | |
| [1]Vulcup ® 40KE (40%), Hercules | 1.27 | 1.27 | 1.27 | 1.27 | |
| TAC (50%), Perkalink ® Triallyl cyanurate, AKZO | 3.3 | 3.3 | 3.3 | 3.3 | |
| Irganox 1010, Ciba-Geigy | 0.95 | 0.95 | 0.95 | 0.5 | |
| Hardness, Shore A | 60 | 65 | 68 | 67 | 65 |
| Stress at 100%, MPa | 1.90 | 2.34 | 2.86 | 2.70 | 2.64 |
| Tensile Strength, MPa | 4.18 | 5.77 | 5.88 | 5.52 | 5.73 |
| Elongation at Break, % | 327 | 338 | 232 | 219 | 315 |
| Tension Set, % | 8 | 9 | 8 | 8 | 11 |
| Compression Set, % 22 hrs. at 100° C. | 40 | 30 | 21 | 27 | 32 |

*Santoprene ® 201-64 (Monsanto Co.)
[1]α,α bis(tert-butylperoxy)diisopropyl benzene
+C2 describes the ethylene content
+ENB describes the 5-ethylidene, 2-norbornene content
°VNB describes the vinyl norbornene content

TABLE II

| Composition | Ex. 6 | Ex. 7 | Ex. 8 | Ex. 9 | Ex. 10 | Ex. 11 |
|---|---|---|---|---|---|---|
| ethylene, alpha-olefin, diene monomer elastomeric polymer | | | | | | * |
| C2 % | 52 | 50 | 50 | 50 | 50 | |
| VNB % | — | 1.6 | 3.0 | 4.9 | 4.9 | |
| ENB % | 9.2 | — | — | — | — | |
| Formulation elastomeric polymer | 100 | 100 | 100 | 100 | 100 | |
| Vulcup 40KE, phr, Hercules | 1.27 | 1.27 | 1.27 | 1.27 | 2.54 | |
| TAC (50%) phr | 3.3 | 3.3 | 3.3 | 3.3 | 3.3 | |
| (1)Polypropylene, 0.7 MFR phr | 32 | 32 | 32 | 32 | 32 | |
| Oil, PetroCanda, HT BrightStock, phr | 49 | 49 | 49 | 49 | 49 | |
| % Cured Rubber Insoluble in Cyclohexane at 23° C. | 92 | 94 | 96 | 96 | 98 | 95 |
| Compression Set, % 22 hrs at 100° C. | 30 | 23 | 21 | 21 | 20 | 32 |
| Hardness, Shore A | 65 | 67 | 68 | 68 | 72 | 65 |

*Santoprene ® ethylene, alpha-olefin, diene monomer elastomeric polymer, polypropylene TPE, Resin Cured
(1)isotactic

TABLE III

| Composition | Ex. 12 | Ex. 13 | Ex. 14 | Ex 15 |
|---|---|---|---|---|
| | | | | Control Resin Cured Santoprene ® |
| VNB 4.9 wt %[1] | 100 | 0 | 0 | |
| VNB 3.0 wt %[2] | 0 | 100 | 0 | |
| VNB 1.6 wt %[3] | 0 | 0 | 100 | |
| isotactic polypropyler MFR 0.7, phr | 32 | 32 | 32 | |
| Oil, PetroCanada, HT Brightstock, phr | 49 | 49 | 49 | |
| Vulcup 40 KE (40%), phr | 1.27 | 1.27 | 1.27 | |
| TAC (50%), phr | 3.3 | 3.3 | 3.3 | |
| Irganox 1010, phr* | 0.95 | 0.95 | 0.95 | |
| Hardness, Shore A | 70 | 68 | 67 | 65 |
| Stress at 100% Strain, MPa | 2.44 | 2.86 | 2.70 | 2.64 |
| Tensile Strength, MPa | 4.13 | 5.88 | 5.52 | 5.73 |
| Elongation at Break, % | 155 | 232 | 219 | 395 |
| Tension Set, % | 7 | 8 | 8 | 11 |
| Compression Set, % 22 hrs at 100° C. | 21 | 21 | 27 | 32 |
| Weight Change, % Fluid ASTM #3, 24 hrs @ 125° C. | 165 | 166 | 176 | 80 |

*Ciba-Geigy
[1]ethylene 50 weight percent, propylene 47.7 weight percent
[2]ethylene 50 weight percent, propylene 48.5 weight percent
[3]ethylene 54 weight percent, propylene 45.3 weight percent

TABLE IV

| Typical Properties | Example 16* | Example 17 |
|---|---|---|
| | | Santoprene ® 201-64 |
| Hardness, Shore A | 70 | 65 |
| Stress @ 100%, MPa | 4.12 | 2.64 |
| Tensile Strength, MPa | 6.45 | 5.73 |
| Elongation at Break, % | 197 | 395 |
| Tension Set, % | 7 | 11 |
| Compression Set, % 22 hrs at 100° C. | 15 | 32 |
| Weight Change, % ASTM #3, 24 hr @ 125° C. | 123 | 80 |

*formulation containing 1) an ethylene (50 wt %), propylene (47.2 wt %), vinyl norbornene (2.8 wt %) elastomeric polymer, 100 parts; isotactic polypropylene, 41 parts per hundred rubber (phr); HT Brightstock, 75 phr; Irganox1010, 1.0 phr; Clay, 42 phr; Vul-cup 40KE, 2.36 phr; Perkalink 300-50D, 3.30 phr.

TABLE V

| | Ex. 18 | Ex. 19 | Ex. 20 |
|---|---|---|---|
| Elastomeric Polymer | | | |
| C2 % (wt) | 75 | 77 | 72 |
| VNB % (wt) | — | 0.8 | 3.2 |
| ENB % (wt) | 3.0 | — | — |
| ML (1 + 4) at 125° C. | 37 | 31 | 42 |
| Elastomeric Polymer | 100 | 100 | 100 |
| Syndiotactic Polypropylene, MFR 2 | 32 | 32 | 32 |
| Vulcup R, Hercules | 0.51 | 0.51 | 0.51 |
| Triallyl Isocyanurate | 1.65 | 1.65 | 1.65 |
| Properties | | | |
| Haze, % | 52 | 57 | 47 |
| Hardness, Shore A | 89 | 89 | 82 |
| Stress @ 100% Strain, MPa | 4.58 | 4.39 | 4.87 |
| Tensile Strength, MPa | 11.73 | 9.97 | 10.98 |
| Elongation at Break, % | 416 | 325 | 258 |
| Tension Set, % | 37 | 42 | 27 |
| Compression Set, % 22 hrs at 100° C. | 46 | 41 | 35 |

TABLE VI

Carbon Black Filled versus Clay-filled Peroxide-cured TPEs based on VNB-EPDM

| Formulation | EX 21 | EX 22 | EX 23 | EX 24 | EX 25 | EX 26 | EX 27 | EX 28 | EX 29 | EX 30 | EX 31 |
|---|---|---|---|---|---|---|---|---|---|---|---|
| | phr | phr | phr | phr | phr | phr | phr | phr | phr | phr | phr |
| EPDM V6469, VNB 4.9%: C2 = 50% | 100 | 100 | 100 | 100 | 100 | 100 | 100 | 100 | 100 | 100 | 100 |
| HT Brightstock Oil | 50 | 72 | 72 | 94 | 116 | 116 | 50 | 72 | 72 | 94 | 116 |
| Vulcup 40KE | 1.27 | 1.66 | 1.66 | 1.95 | 2.04 | 2.04 | 1.27 | 1.66 | 1.66 | 1.95 | 2.04 |
| Perkalink 300-50D | 3.3 | 3.3 | 3.3 | 3.3 | 6.1 | 6.1 | 3.3 | 3.3 | 3.3 | 3.3 | 6.1 |
| N774 Black | 42 | 42 | 42 | 42 | 42 | 42 | 0 | 0 | 0 | 0 | 0 |
| Clay | 0 | 0 | 0 | 0 | 0 | 0 | 42 | 42 | 42 | 42 | 42 |
| Isotactic Polypropylene, MFR = 0.7 | 28 | 32 | 28 | 32 | 28 | 32 | 28 | 32 | 28 | 32 | 32 |

TABLE VI-continued

Carbon Black Filled versus Clay-filled Peroxide-cured TPEs based on VNB-EPDM

|  | EX 21 | EX 22 | EX 23 | EX 24 | EX 25 | EX 26 | EX 27 | EX 28 | EX 29 | EX 30 | EX 31 |
|---|---|---|---|---|---|---|---|---|---|---|---|
| Isotactic Polypropylene, MFR = 200 | 0 | 3.5 | 0 | 3.5 | 0 | 3.5 | 0 | 3.5 | 0 | 3.5 | 3.5 |
| Hardness, Shore A | 60 | 61 | 57 | 60 | 46 | 53 | 60 | 64 | 57 | 58 | 56 |
| Stress at 100% strain, MPa | 2.51 | 2.62 | 2.37 | 2.53 | 1.69 | 2.11 | 2.81 | 2.91 | 2.59 | 2.28 | 2.14 |
| Tensile Strength, MPa | 6.30 | 6.31 | 8.01 | 4.29 | 3.78 | 3.78 | 5.05 | 5.57 | 4.73 | 4.49 | 3.64 |
| Elongation at Break, % | 251 | 264 | 243 | 177 | 214 | 190 | 229 | 231 | 213 | 233 | 209 |
| Toughness, MPa | 8.16 | 8.95 | 7.36 | 4.21 | 4.11 | 3.91 | 6.87 | 7.47 | 5.81 | 6.01 | 4.72 |
| Tension Set, % | 7 | 7 | 5 | 6 | 4 | 5 | 6 | 8 | 6 | 7 | 6 |
| Compression Set, % 22 h at 100 C. | 23 | 25 | 12 | 21 | 18 | 17 | 25 | 25 | 19 | 24 | 22 |
| Weight Change, % ASTM3, 24 h @ 125 C. | 161 | 147 | 144 | 125 | 121 | 132 | 182 | 143 | 159 | 138 | 123 |

We claim:

1. A thermoplastic elastomer comprising:
   a) an ethylene, alpha-olefin, vinyl norbornene elastomeric polymer;
   b) a crystalline thermoplastic selected from the group consisting of homopolymers and copolymers of polypropylene, polybutylene, homopolymers and copolymers of ethylene, polyethylene terephthalate, polybutylene terephthalate, polyamides, and mixtures thereof; and
   c) a curative comprising an organic peroxide;
wherein said curative is present in said thermoplastic elastomer in an amount effective to yield a cure level of said elastomeric polymer of at least about 95 percent; wherein said elastomeric polymer has a $M_w/M_n$ greater than 6; and wherein said elastomeric polymer has a branching index below about 0.6.

2. The thermoplastic elastomer of claim 1 wherein said curative is present in said thermoplastic elastomer in an amount effective to yield a cure level of at least about 97 percent.

3. The thermoplastic elastomer of claim 2 wherein compression set does not exceed about 28 percent as measured after 22 hours at 100° C. by test method ASTM D 395B.

4. The thermoplastic elastomer of claim 2 wherein compression set does not exceed about 27 percent as measured after 22 hours at 100° C. by test method ASTM D 395B.

5. The thermoplastic elastomer of claim 2 wherein compression set does not exceed about 25 percent as measured after 22 hours at 100° C. by test method ASTM D 395B.

6. The thermoplastic elastomer of claim 1 wherein said alpha-olefin is selected from the group consisting of, propylene, hexene-1, octene-1, and combinations thereof.

7. The thermoplastic elastomer of claim 1 wherein said elastomeric polymer includes:
   said ethylene in the range of from about 40 to about 90 mole percent; said vinyl norbornene in the range of from about 0.2 to about 5 mole percent, and said alpha-olefin in the range of from about 10 to about 60 mole percent, said mole percents based on the total moles of the polymer;
   wherein said elastomeric polymer has a Mooney viscosity in the range of from ML (1+4), 125° C. of about to a 10 MST (5+4) @ 200° C. of about 90; and
   wherein said elastomeric polymer has a $M_w/M_n$ above about 10.

8. The thermoplastic elastomer of claim 1 wherein said elastomeric polymer includes:
   said ethylene in the range of from about 50 to about 90 mole percent; and
   said vinyl norbornene in the range of from about 0.2 to about 4 mole percent, and said alpha-olefin in the range of from about 50 to about 10 mole percent, said mole percents based on the total moles of the elastomeric polymer;
   wherein said elastomeric polymer has a Mooney viscosity in the range of from ML (1+4), 125° C. of about 15 to a MST (5+4) @ 200° C. of about 70.

9. The thermoplastic elastomer of claim 1 wherein said elastomeric polymer includes:
   said ethylene in the range of from about 50 to about 85 mole percent; said vinyl norbornene in the range of from about 0.4 to about 1.5 mole percent, and said alpha-olefin in the range of from about 50 to about 15 mole percent, said mole percents based on the total moles of the elastomeric polymer;
   wherein said ethylene alpha olefin vinyl norbornene polymer has a Mooney viscosity in the range of from ML (1+4), 125° C. of about 20 to a MST (5+4) @ 200° C. of 60.

10. The thermoplastic elastomer of claim 9 wherein said cure level of said elastomeric polymer exceeds about 96 percent.

11. A thermoplastic elastomer comprising:
   a) an ethylene, alpha-olefin, vinyl norbornene elastomeric polymer, said elastomeric polymer including:
      i) in the range of about 70 to about 90 mole percent ethylene; and
      ii) in the range of from about 0.2 to about 1.5 mole percent vinyl norbornene,
      iii) in the range of from about 10 to about 30 mole percent of said alpha-olefin,
   said mole percents based on the total moles of the elastomeric copolymer; and wherein said elastomeric copolymer has a $M_w/M_n$ greater than 6, and a branching index in the range of from about 0.1 to about 0.3,
   b) a crystalline thermoplastic selected from the group consisting of thermoplastic homopolymers and copolymers of propylene, polybutylene, homopolymers and copolymers of ethylene, polyethylene terephthalate, polybutylene terephthalate, polyamides, and mixtures thereof; and
   c) a curative comprising an orgain peroxide;
   d) a cure adjuvant; and
   wherein said curative and said cure adjuvant are present in said thermoplastic elastomer at an amount effective to yield at least about 95 percent cured elastomeric polymer.

12. The thermoplastic elastomer of claim 11 wherein said curative is α,α bis (tert-butylperoxy)di isopropyl benzene; and wherein said cure adjuvant is selected from the group consisting of triallyl cyanurate and triallylisocyanurate.

13. The thermoplastic elastomer of claim 12 wherein said curative is present in said thermoplastic elastomer in an amount effective to yield at least about 96 percent cured elastomeric polymer and wherein said elastomeric polymer has a $M_w/M_n$ above about 10.

14. A lens gasket made from the thermoplastic elastomer of claim 12.

15. A thermoplastic elastomer comprising:
   a) an ethylene, propylene, vinylnorbornene elastomeric polymer, wherein:
      i) said ethylene is present in said polymer in the range of from about 50 to about 85 mole percent;
      ii) said vinyl norbornene is present in said polymer in the range of from about 0.4 to about 1.5 mole percent;
      iii) said propylene is present in the range of from about 15 to about 50 mole percent;
      said mole percents based on the total moles in said elastomeric polymer;
      iv) said elastomeric polymer has a ML(1+4) at 125° C. above about 20 and a MST(5+4) at 200° C. below about 60 and;
      v) said elastomeric polymer has a $M_w/M_n$ above about 10,
   b) a thermoplastic selected from the group consisting of polypropylene and blends of polypropylene, said thermoplastic having:
      i) a melt flow rate measured according to test method ASTM-D1238 in the range off from about 0.1 to about 30 dg/min; and
   c) a curative system, said curative system including $\alpha,\alpha$-bis(tert-butylperoxy)diisopropyl benzene and triallyl cyanurate;
   wherein;
      said thermoplastic is present in said thermoplastic elastomer in the range of from about 20 to about 100 parts per hundred parts of said elastomeric polymer;
      wherein said $\alpha,\alpha$-bis(tert-butylperoxy)diisopropyl benzene and triallyl cyanurate is present in said thermoplastic elastomer in the range of from about $7\times10^{-4}$ to about $1.5\times10^{-3}$ mole per hundred parts of said elastomeric polymer; and
      wherein said thermoplastic elastomer has a cured polymer portion exceeding about 95 percent.

16. A method for preparing a thermoplastic elastomer comprising:
   a) masticating
      i) an ethylene, alpha-olefin, vinyl norbornene elastomeric polymer,
      ii) a crystalline thermoplastic present in said thermoplastic elastomer in the range of from about 10 to about 900 parts per hundred parts of said elastomeric polymer; and
      iii) a curative comprising an organic peroxide, said curative being present at a level to cure said elastomeric polymer to above about 95 percent, said masticating carried out for a sufficient time to obtain a substantially homogeneous mixture;
   b) adding a cure activator; and
   c) masticating a product of (a) and (b) at a temperature and for a time sufficient to yield about 95 percent or greater cure of said elastomeric polymer.

17. The method of claim 16 wherein said elastomeric polymer includes:
   i) said ethylene in the range of from about 40 to about 90 mole percent;
   ii) said vinyl norbornene in the range of from about 0.2 to about 5 mole percent;
   iii) said alpha-olefin in the range of from about 10 to about 60 mole percent; said mole percents based on the total moles of said elastomeric polymer;

wherein said thermoplastic is polypropylene; wherein said curative is $\alpha,\alpha$bis (tert-butlylperoxy) diisopropyl benzene; and wherein said cure activator is triallyl cyanurate; and wherein said elastomeric polymer has a $M_w/M_n$ greater than 6.

18. The method of claim 17 wherein said elastomeric polymer has a Mooney viscosity in the range of from about ML (1+4) at 125° C. of 20 to about. MST (5+4) @ 200° C. of 60, and wherein said elastomeric polymer has a $M_w/M_n$ above about 10.

19. The method of claim 18 wherein said curative is present in said thermoplastic elastomer in the range of from about $7\times10^{-4}$ mole to about $1.5\times10^{-3}$ mole per hundred parts of said elastomeric polymer.

20. The method of claim 19 where is said polypropylene is present in said thermoplastic elastomer in the range of from about 20 to about 100 parts per hundred parts of said elastomeric polymer, wherein said methods is carried out in an inert atmosphere.

21. A thermoplastic elastomer comprising:
   a) an ethylene, propylene, vinylnorbornene elastomeric polymer, wherein:
      i) said ethylene is present in said polymer in the range of from about 50 to about 85 mole percent;
      ii) said vinyl norbornene is present in said polymer in the range of from about 0.4 to about 1.5 mole percent;
      iii) said propylene is present in the range of from about 15 to about 50 mole percent;
      said mole percents based on the total moles in said elastomeric polymer;
      iv) said elastomeric polymer has a ML(1+4) at 125° C. above about 20 and a MST(5+4) at 200° C. below about 60;
      v) said elastomeric polymer has a branching index in the range of from about 0.1 to about 0.3; and
      vi) said elastomeric polymer has a $M_w/M_n$ above about 10;
   b) a crystalline thermoplastic selected from the group consisting of polypropylene and blends of polypropylene, said thermoplastic having:
      i) a melt flow rate measured according to test method ASTM-D1238 in the range of from about 0.1 to about 30 dg/min; and
   c) a curative system, said curative system including $\alpha,\alpha$-bis(tert-butylperoxy)diisopropyl benzene and triallyl cyanurate;
   wherein;
      said thermoplastic is present in said thermoplastic elastomer in the range of from about 20 to about 100 per hundred parts of said elastomeric polymer;
      wherein said $\alpha,\alpha$-bis(tert-butylperoxy)diisopropyl benzene and triallyl cyanurate is present in said thermoplastic elastomer in the range of from about $7\times10^{-4}$ to about $1.5\times10^{-3}$ mole per hundred parts of said elastomeric polymer; and
      wherein said thermoplastic elastomer has a cured polymer portion exceeding about 95 percent.

22. The thermoplastic elastomer of claim 1 wherein said elastomeric polymer consists of said ethylene, said alpha-olefin and said vinyl norbornene.

* * * * *